United States Patent
Lutz

(10) Patent No.: US 12,246,466 B2
(45) Date of Patent: Mar. 11, 2025

(54) CUTTER BAR, IN PARTICULAR COUNTER-BLADE FOR CHOPPING MACHINES

(71) Applicant: Gebrüder Busatis Gesellschaft m.b.H., Purgstall an der Erlauf (AT)

(72) Inventor: Wolfgang Lutz, Wieselburg (AT)

(73) Assignee: Gebrüder Busatis Gesellschaft m.b.H., Purgstall an der Erlauf (AT)

( * ) Notice: Subject to any disclaimer, the term of this patent is extended or adjusted under 35 U.S.C. 154(b) by 261 days.

(21) Appl. No.: 17/679,437

(22) Filed: Feb. 24, 2022

(65) Prior Publication Data
US 2022/0274275 A1  Sep. 1, 2022

(30) Foreign Application Priority Data
Feb. 26, 2021 (AT) .............................. A 50134/2021

(51) Int. Cl.
*B26D 1/00*  (2006.01)

(52) U.S. Cl.
CPC ...... *B26D 1/0006* (2013.01); *B26D 2001/002* (2013.01); *B26D 2001/0053* (2013.01)

(58) Field of Classification Search
CPC ............ B26D 1/0006; B26D 2001/002; B26D 2001/0053; B26D 2001/001; B22F 10/25; B22F 7/08; B23P 15/40; A01F 29/00; A01F 29/08; A01F 29/09; B02C 2018/88; B02C 18/18; B33Y 10/00; B33Y 80/00
USPC ................. 83/651; 241/300; 76/101.1, 104.1
See application file for complete search history.

(56) References Cited

U.S. PATENT DOCUMENTS

| 4,428,260 A | * | 1/1984 | Eby | B23P 15/40 |
| | | | | 76/104.1 |
| 9,675,010 B2 | * | 6/2017 | McLawhorn | B02C 18/18 |
| 2002/0179759 A1 | * | 12/2002 | Dillon | A01F 29/09 |
| | | | | 241/300 |
| 2020/0396898 A1 | * | 12/2020 | Essig | A01F 29/09 |

FOREIGN PATENT DOCUMENTS

| CN | 109072591 A | * | 12/2018 | ............... B22F 7/00 |
| DE | 60211063 T2 | | 11/2006 | |
| DE | 102014108607 A1 | | 12/2015 | |
| EP | 2940169 A1 | * | 11/2015 | ............. B02C 13/28 |
| EP | 3061338 A1 | | 8/2016 | |
| WO | WO-2013106560 A1 | * | 7/2013 | ........... A01B 33/103 |

OTHER PUBLICATIONS

AT Office Action and Search Report dated Jan. 28, 2022 of application No. A50134/2021.

* cited by examiner

*Primary Examiner* — Ghassem Alie
(74) *Attorney, Agent, or Firm* — Gordon & Jacobson, P.C.

(57) ABSTRACT

The present disclosure relates to a cutter bar for chopping machines. The cutter bar includes a cutter bar body that defines an edge groove. The edge groove includes a groove bottom and a groove sidewall. The groove sidewall is formed by the material of the cutter bar body. A wear protection structure extends along a surface of the cutter bar body from the edge groove. The wear protection structure is built up on the surface of the cutter bar body as an additively manufactured metal powder application layer. At least one carbide strip is secured to the edge groove and forms the cutting edge. The carbide strip can be fastened to the edge groove by means of a bonding agent, such as solder or adhesive.

20 Claims, 2 Drawing Sheets

CUTTER BAR, IN PARTICULAR COUNTER-BLADE FOR CHOPPING MACHINES

CROSS-REFERENCE TO RELATED APPLICATION(S)

The present disclosure claims priority from Austrian Patent Appl. No. A50134/2021, filed on Feb. 26, 2021, herein incorporated by reference in its entirety.

BACKGROUND

1. Field

The present disclosure relates to a cutter bar (such as a counter-blade) for chopping machines. Further, the present disclosure relates to a method for manufacturing such cutter bars.

2. State of the Art

Cutting machines employ cutter bars or counter-blades. One example cutting machine is a harvesting machine for corn, for example, where the stalked crop is chopped in the chopping machine after having been cut and before being fed for further processing. The chopping machines have fixed cutter bars with surfaces that define a cutting edge. The material to cut is fed to the cutting edge, where it is cut by passing knives. During this chopping process, high forces are generated on the cutter bar, which can cause wear on the cutter bar. These forces can be particularly destructive if hard materials such as small stones and the like are carried along by the cut material.

The positional designations used herein, e.g., "upper surface," refer to the usual position of use of the cutter bar during chopping, even though the cutter bar may adopt other positions during manipulation.

To limit wear, it is known to form the cutting edges by carbide strips (e.g., cemented carbide profile strips) fastened in edge grooves and to apply a wear protection layer to the upper surface of the cutter bar body. Wear protection layers are known in the prior art as flame sprayed layers. Such wear protection layers extend on the upper surface of the cutter bar body between the carbide strips, which are fastened by an adhesive or solder joint and form the cutting edges. These wear protection layers are intended to prevent premature wear of the unhardened base material of the cutter bar body due to the abrasive cut material sliding over it during the cutting process.

Document EP 3 061 138 A1 shows the prior art of a wear protection layer which is applied by flame spraying and subsequent fusion bonding. The transition from the wear protection layer to the carbide strips cannot be made without gaps. A gap-free design is not possible because a narrow melt pool support is required, which prevents the uncontrolled flow of the molten coating material during fusion bonding. As can be seen in FIG. 3 and FIG. 7 of this document, the groove sidewall is not formed in any wall section by the material of the wear protection layer, but only the uppermost region of the groove sidewall forms the outer wall of the narrow melt pool support with the material of the cutter bar body.

Because the highest specific wear occurs on the upper surface of the cutter bar body in the immediate vicinity of the carbide strip, it is important that the wear protection layer has a sufficient thickness in this area, that the transition from the wear protection layer to the cemented carbide profile strip is gap-free and that the connecting edge of the wear protection layer to the cemented carbide profile strip is precisely formed.

A problem arises from the fact that, in the case of a flame sprayed layer according to EP 3 061 138 A1, the transition from the wear protection layer to the carbide strip cannot be designed without gaps and thus represents a point of attack for foreign bodies. This can lead to the carbide strip breaking away.

A further problem arises because, in the case of wear protection layers applied by flame spraying according to the prior art, rounding of the run-out areas of the wear protection layers occurs during fusion bonding of the sprayed layers, so that mechanical finishing of the connecting surfaces to the carbide strips is necessary to produce exact connecting edges. This is an additional expensive operation. Furthermore, this process results in lower layer thicknesses along the cemented carbide profile strip in the run-out area of the sprayed layers so that premature washout occurs in this area of highest specific wear.

SUMMARY

The present disclosure aims to avoid the disadvantages mentioned and to provide cutter bars in such a way that they are resistant to wear to an increased degree, even when foreign bodies are present. Furthermore, it is intended to increase economic efficiency by minimizing the costly material for such metal powder application processes and by applying the wear protection layers primarily where the highest specific wear occurs.

The inventive cutter bar, in particular the counter-blade for chopping machines, has a cutter bar body, which has on its upper surface, at least in sections, a wear protection structure and an edge groove. The edge groove includes a groove bottom and a groove sidewall. The groove sidewall is defined by a first wall portion made of the material of the cutter bar body. A wear protection structure is formed on the upper surface of the cutter bar body that extends from the edge groove. The wear protection structure includes a second wall portion formed by a thickened area of the wear protection structure that extends from the first wall portion of the groove sidewall. At least the thickened area of the wear protection structure is formed as an additively manufactured metal powder application layer without mechanical finishing. At least one carbide strip (e.g., cemented carbide profile strip) is secured to the edge groove, for example, by means of a bonding agent such as solder or adhesive.

In an embodiment, the upper surface of the cutter bar body can be flat in shape, and the thickened area of the wear protection structure can provide a stepped transition (i.e., connecting surface) to the at least one carbide strip.

In an alternative embodiment, the upper surface of the cutter bar body can be cambered in shape, the upper surface of the wear protection structure can be flat in form, and the thickened area of the wear protection structure can provide a step-less transition (i.e., connecting surface) to the at least one carbide strip.

In embodiments, the cutter bar body can have a substantially rectangular cross-section and is provided with an edge groove, and the at least one carbide strip can be disposed on each of two edges. The wear protection structure can extend between the two mutually parallel edge grooves with the at least one carbide strip inserted therein.

In embodiments, the at least one carbide strip and the edge groove receiving the carbide strip can have an internal angle less than or equal to 90°.

In embodiments, the at least one carbide strip can be formed from a plurality of carbide elements arranged in succession in the edge groove.

The method for manufacturing the cutter bar includes forming an edge groove in a cutter bar body, preferably by milling. The edge groove includes a groove bottom and a groove sidewall. The groove sidewall is defined by a first wall portion made of the material of the cutter bar body. A wear protection structure is formed on the upper surface of the cutter bar body that extends from the edge groove. The wear protection structure includes a second wall portion formed by a thickened area of the wear protection structure that extends from the first wall portion of the groove sidewall. At least the thickened area of the wear protection structure is formed as an additively manufactured metal powder application layer without mechanical finishing. At least one carbide strip is secured to the edge groove, for example, by means of a bonding agent such as solder or adhesive.

The additively manufactured metal powder application layer may be applied in strip form along the edge groove, with the thickened area of the wear protection structure being formed in the immediate vicinity of the edge groove.

The additively manufactured metal powder application layer may be applied by means of laser metal deposition with a melting temperature greater than 1100° Celsius, and the fastening of the carbide strip in the edge groove may be carried out with the soldering temperature or bonding temperature less than 1100° Celsius.

Preferably, the connection between the wear protection structure and the at least one carbide strip is jointless.

The thickened area of the wear protection structure can be formed by increasing the layer thickness of the metal powder application layer by increased powder supply per unit area or by repeated metal powder application layers lying one on top of the other.

Preferably, the cutting edge defined by the at least one carbide strip can be machined to precise dimensions, for example, by grinding.

The method may also be characterized in that a weld pool support is inserted into the edge groove, which is milled in the cutter bar body and held therein. After forming the wear protection structure, the weld pool support can be removed before securing the at least one carbide strip to the edge groove.

BRIEF DESCRIPTION OF THE DRAWINGS

In the following, the embodiments of the present disclosure are explained in more detail with reference to the drawings.

DETAILED DESCRIPTION OF THE PREFERRED EMBODIMENTS

Figure 1:
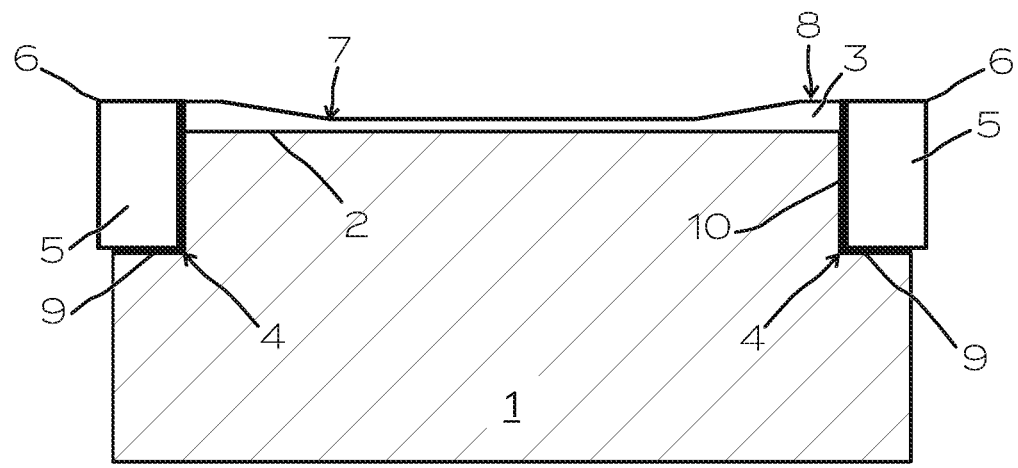
FIG. 1 is a cross-section through the cutter bar in an alternative.

FIG. 1 shows a cross-sectional view of a cutter bar according to an embodiment of the present disclosure. The cutter bar body 1 is the shaping and load-bearing element of the cutter bar and is usually made of high-quality steel of the type used in the machine industry for load-bearing elements. The upper surface 2 of the cutter bar body 1 is covered by the wear protection structure 3 and is intended to be protected from wear caused by the abrasive cut material sliding over it during the cutting process.

Figure 5:
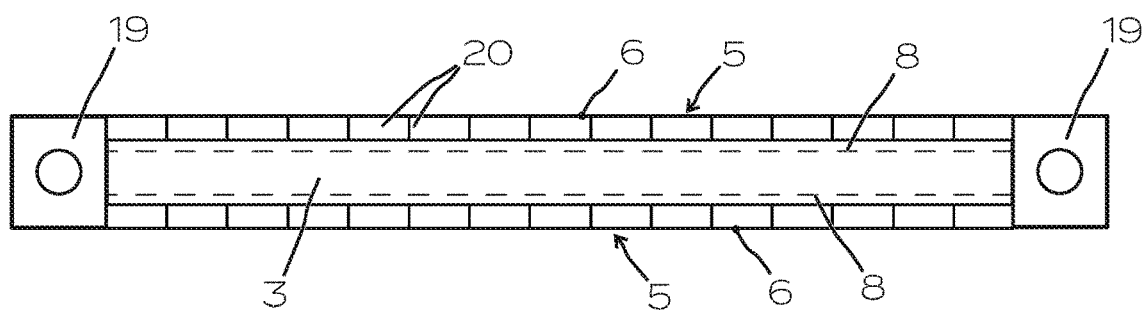
FIG. 5 shows an illustrative top view of a finished cutter bar.

The cutter bar is an elongated bar, as shown for example in FIG. 5 in top view. An edge groove 4, into which the cemented carbide profile strips 5 are inserted, extends along each of the two edges. The cemented carbide profile strips 5 form the cutting edges 6, past which the moving knife not shown here is guided in order to cut the abrasive cut material sliding over the upper surface 7 of the wear protection structure 3.

Furthermore, it can be seen in FIG. 1 that, along the edge grooves 4 and the cemented carbide profile strips 5 inserted therein, the wear protection structure 3 has an area 8 with a thickened cross-section, while the thickness of the wear protection structure 3 is thinner in the less wear-stressed central area of the upper surface 2 of the cutter bar body 1, so that in this part the material application is kept lower or can even be omitted.

By way of example only, it is mentioned that thicknesses of 0.2 to 0.4 mm of the wear protection structure in the less stressed area and 1 to 1.5 mm in the thickened area have proved favorable, without limiting the invention to these thicknesses.

The edge groove 4 comprises a groove bottom 9 and a groove sidewall 10, in which the cemented carbide profile strips 5 are fastened by means of a bonding agent such as solder or adhesive. The bonding agent is identified with reference number 11 and shown as a thick line.

Figure 2:
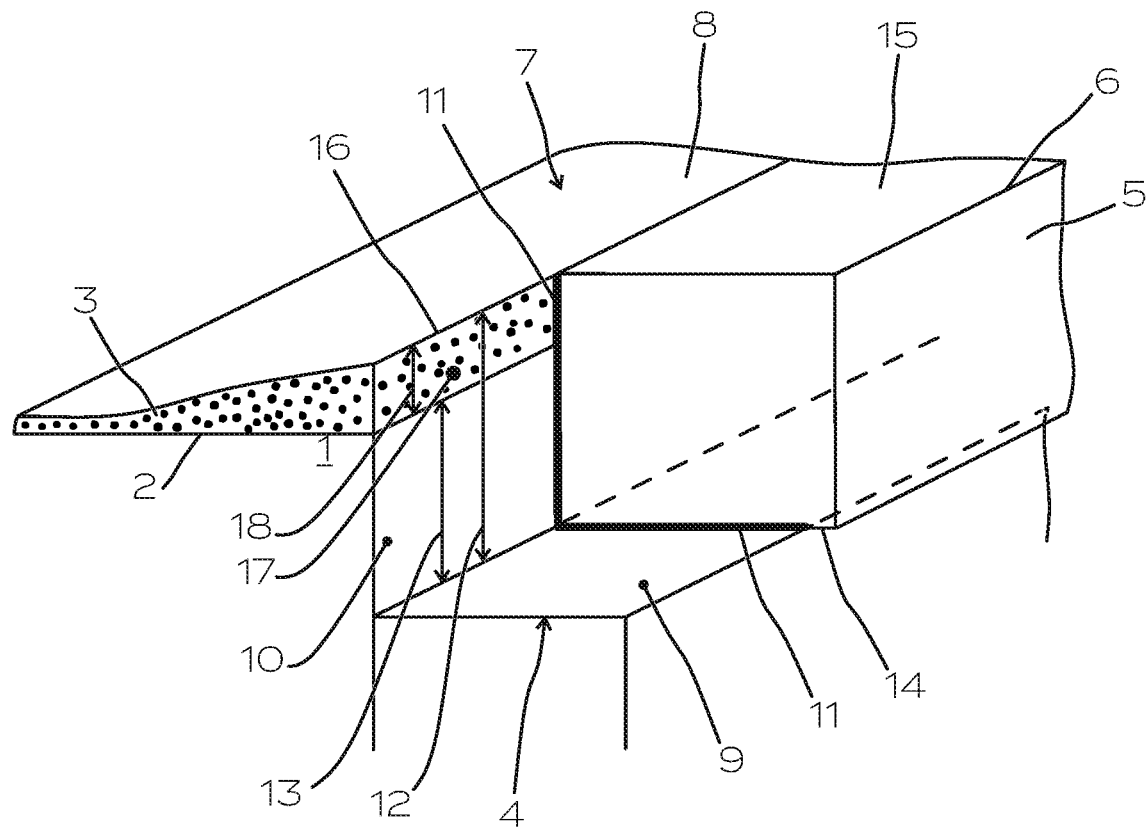
FIG. 2 schematically shows an oblique view of the edge groove area.

FIG. 2 shows the area of the edge groove 4 and the cemented carbide profile strip 5 inserted therein. The edge groove 4 has a groove bottom 9, which is made entirely of the material of the cutter bar body 1. The groove sidewall 10 extends over the groove height 12, which extends from the groove bottom 9 to the upper surface 7 of the wear protection structure 3. As shown in FIG. 2, the groove sidewall 10 is formed in a first wall portion by the material of the cutter bar body 1 (height 13 of the groove sidewall 10 in the cutter bar body 1) and in a second wall portion by the material of the wear protection structure 3, the latter being an additively manufactured metal powder application layer as a special feature. The thickened area 8 of the wear protection structure 3 extends along the edge groove 4 and the cemented carbide profile strip 5 inserted therein. The height of the cemented carbide profile strip 5 corresponds as closely as possible or exactly to the height 12 of the edge groove 4. In the width direction, the cemented carbide profile strip 5 protrudes slightly with respect to the groove bottom 9, as also shown in FIG. 1. This protrusion 14 allows the cutting edge 6 of the cemented carbide profile strip 5 to be finished mechanically by grinding. The upper surface 15 of the cemented carbide profile strip 5 is flush with the thickened area 8 of the wear protection structure 3, so that there is no burr or step that could interfere with the material flow of the cut material sliding over the upper surface 7 of the wear protection structure 3 and the upper surface 15 of the cemented carbide profile strip 5.

Between the cemented carbide profile strip 5 and the groove bottom 9 as well as the groove sidewall 10 is the layer of bonding agent 11, which is preferably a solder or an adhesive.

In embodiments, the groove sidewall 10 can be formed completely and accurately before the cemented carbide profile strip 5 is glued or soldered in place. According to the present disclosure, this is achieved by manufacturing the wear protection structure 3 additively as a metal powder application layer. The wear protection structure 3 is built up very precisely over the required height 18 of the connecting surface 17, forming an exact connecting edge 16. In this thickened area 8, there is also the advantage of a slightly porous texture of this section of the groove sidewall 10, which bonds particularly well with the bonding agent 11, increasing the strength at the transition from the wear protection structure 3 to the cemented carbide profile strip 5.

Figure 3:
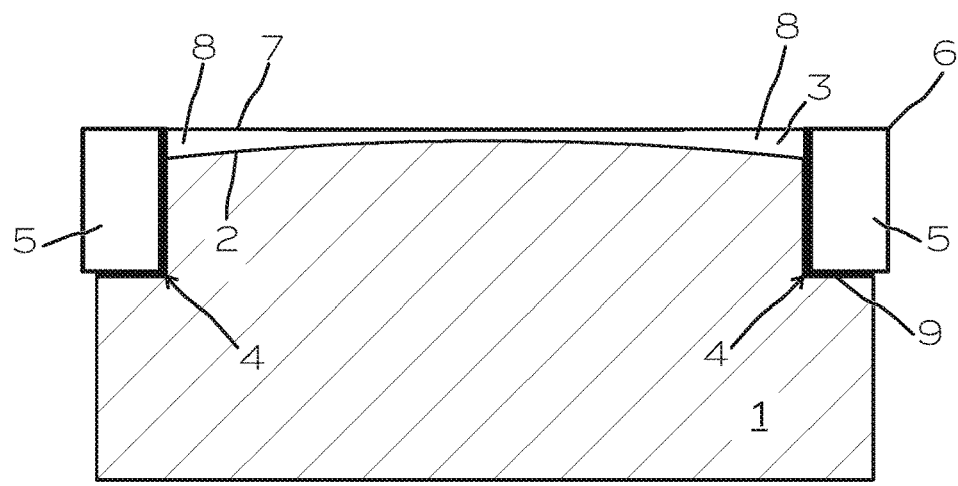
FIG. 3 shows an alternative to the embodiment according to FIG. 1.

FIG. 3 shows a modified embodiment of the cutter bar compared with FIG. 1, with the upper surface 2 of the cutter bar body being cambered at the top. The wear protection structure 3 applied to it with the upper surface 7 being flat in shape is thus provided in the desired manner along the edge groove 4 and the cemented carbide profile strip 5 inserted therein with a thickened area 8 which corresponds in effect to that of FIG. 1.

It is understandable that the upper surface 7 of the wear protection structure 3 does not have to be entirely flat, but can also be combined with depressions or elevations, depending on the requirements of the locally different wear stress.

Figure 4:
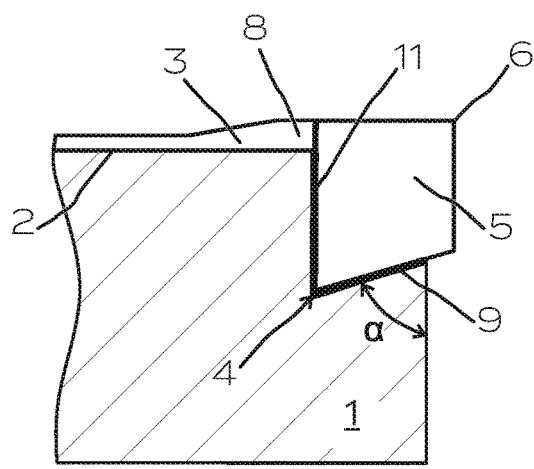
FIG. 4 shows another alternative for forming the edge groove.

FIG. 4 shows a variant for the formation of the edge groove 4 and the cemented carbide profile strip 5 inserted therein. The internal angle α of the non-horizontal groove bottom 9 is <90°, whereas this internal angle is exactly 90° in the embodiment according to FIG. 2. With an internal angle <90°, the advantage can be achieved that, in addition to horizontal force components acting laterally outward on the cemented carbide profile strip 5 being absorbed by the holding force of the bonding agent 11, a support is provided on the non-horizontal groove bottom 9, wherein this embodiment can absorb higher forces than the embodiment according to FIG. 2. As an example, the angle may be in the range between 90° and 45°, without limiting the invention.

FIG. 5 shows a top view of a cutter bar as shown in the cross-section of FIG. 1. The cutter bar is an elongated bar consisting substantially of the cutter bar body 1. Fastening sections 19 are shown schematically at the two ends. With these fastening sections 19, the cutter bar can be firmly anchored in the chopping machine.

Here, the wear protection structure 3 extends over the entire upper surface 2 of the cutter bar body 1 between the cemented carbide profile strips 5, the thickened areas 8 of the wear protection structure 3 being indicated in dashed lines.

The cemented carbide profile strips 5 are composed of cemented carbide profile elements 20, which are inserted in succession into the edge grooves 4. Typically, the cemented carbide profile elements 20 have a length of about 2 to 4 cm, resulting in a length of the cemented carbide profile strip 5 of 50 cm to 100 cm. However, these dimensions are not restrictive.

When manufacturing the cutter bar according to the present disclosure, the cutter bar body 1 is formed from a blank of solid material that is substantially rectangular in cross-section. The body is milled to define the edge grooves 4, which form the groove bottom 9 and the section of the groove sidewall 10 located in the cutter bar body 1. The wear protection structure 3 is then applied to the upper surface 2 of the cutter bar body 1 by means of a beam-based metal powder application process. This is done in strips, with strips being placed next to strips. This application process is to be carried out so precisely that the wear protection structure 3 is formed with exact connecting edges 16. It is not necessary to mechanically finish the connecting surface 17 of the wear protection structure 3 formed in this way.

The beam-based metal powder application process in the form of laser metal deposition requires high temperatures of greater than 1100° Celsius. The particularly high wear resistance results from the hard alloys and hard composites which form the wear protection structure 3.

In contrast, the insertion and fastening of the cemented carbide profile strip 5 in the edge groove 4 is preferably carried out by means of solder or with appropriate adhesive. The soldering temperature is 700° to 800° Celsius. An adhesion temperature is considerably lower. This also results in the particular advantage of the present method. It would not be possible, or hardly possible, to solder the cemented carbide profile strip 5 into the milled section of the edge groove 4 and then apply the wear protection structure 3 in a subsequent step by the beam-based metal powder application method. At the high temperatures of over 1100° Celsius required for this, the fastening by means of a bonding agent 11 would be destroyed or weakened, which could lead to the cemented carbide profile strip 5 breaking away.

After soldering or bonding in the cemented carbide profile strip 5 or its elements 20, it may be necessary to finish the cutting edge 6 to size in a grinding process, for which sufficient material remains due to the protrusion 14 of the cemented carbide profile strip 5 beyond the groove bottom 9. Overgrinding of the upper surface 7 of the wear protection structure 3 in the thickened area 8 and the upper surface 15 of the cemented carbide profile strip 5 can possibly be carried out, but is not fundamentally necessary.

In practice, the following materials, for example, are used, although the citation of these materials is not restrictive and is only exemplary: hard alloys such as iron-based alloys with metallurgically precipitated hard phases and hard composites such as nickel-based alloys with synthetic hard materials.

The layer thickness of the metal powder application layer can be adjusted in several ways in the laser metal deposition process used in accordance with the present disclosure. For example, the amount of powder fed per unit time can be varied. The feed rate of the laser head with the powder nozzle can also be varied, so that the dwell times per area vary. Furthermore, it is also possible to superimpose the metal powder application layers in several layers, so that, for example, the upper surface 2 of the cutter bar body 1 is provided entirely with a single wear protection structure 3 and that in the particularly highly stressed area along the edge groove 4, two or more layers are superimposed.

To achieve a flush connecting surface 17 with a straight connecting edge 16, which does not require any finishing, it is also possible to insert a weld pool support in the edge groove 4 during application of the metal powder application layer, as already described above.

LIST OF REFERENCE NUMBERS

1 Cutter bar body
2 Upper surface of the cutter bar body
3 Wear protection structure
4 Edge groove
5 Cemented carbide profile strip
6 Cutting edge
7 Upper surface of the wear protection structure
8 Thickened area of the wear protection structure
9 Groove bottom
10 Groove sidewall
11 Bonding agent 12 Height of the edge groove
13 Section of the groove sidewall in the cutter bar body
14 Protrusion of the cemented carbide profile strip
15 Upper surface of the cemented carbide profile strip
16 Connecting edge of the wear protection structure
17 Connecting surface of the wear protection structure
18 Height of the connecting surface of the wear protection structure
19 Fastening sections
20 Cemented carbide profile elements

The invention claimed is:

1. A cutter bar for a chopping machine, the cutter bar comprising:
a cutter bar body defining at least one edge groove having a groove bottom and a groove sidewall, the groove sidewall having a first wall portion formed from the material of the cutter bar body;
a wear protection structure extending along a flat top surface of the cutter bar body from the edge groove, wherein the wear protection structure includes a central portion that covers a central area of the cutter bar body and a second wall portion that extends above the first wall portion of the groove sidewall, wherein an exposed upper surface of the wear protection surface disposed opposite the flat top surface of the cutter bar body tapers upward relative to the flat top surface of the cutter bar body from the central portion to the second wall portion with the central portion having a first thickness and the second wall portion having a second thickness greater than the first thickness; and
at least one carbide strip disposed within the edge groove and secured to the edge groove adjacent the first wall portion of the groove sidewall and the second wall portion of the wear protection structure, wherein the at least one carbide strip forms a cutting edge.

2. The cutter bar according to claim 1, wherein:
the taper of the exposed upper surface of the wear protection structure provides a stepped transition to the at least one carbide strip.

3. The cutter bar according to claim 1, wherein:
the cutter bar body has a substantially rectangular cross-section and the at least one edge groove includes two edge grooves disposed on two opposed edges of the cutter bar body; and
the wear protection structure extends between the two edge grooves.

4. The cutter bar according to claim 1, wherein:
the at least one edge groove includes two parallel edge grooves formed by the cutter bar body, and the wear protection structure extends between the two parallel edge grooves.

5. The cutter bar according to claim 1, wherein:
the groove bottom of the groove edge and a corresponding surface of the at least one carbide strip that interfaces to the groove bottom have an internal angle $\alpha$ less than or equal to 90°.

6. The cutter bar according to claim 1, wherein:
the at least one carbide strip comprises a plurality of carbide strips which are arranged in succession in the edge groove.

7. The cutter bar according to claim 1, wherein:
the at least one carbide strip is secured to the edge groove by a bonding agent.

8. The cutter bar according to claim 7, wherein:
the bonding agent comprises solder or adhesive.

9. The cutter bar according to claim 1, wherein:
the at least one carbide strip comprises at least one cemented carbide profile strip.

10. The cutter bar according to claim 1, wherein:
a portion of the exposed upper surface of the wear protection structure is flat.

11. A cutter bar for a chopping machine, the cutter bar comprising:
a cutter bar body defining opposed first and second edge grooves, wherein the first and second edge grooves each have a groove bottom and a groove sidewall, the groove sidewall having a first wall portion formed from the material of the cutter bar body;
a wear protection structure extending along a flat top surface of the cutter bar body between the first and second edge grooves, wherein the wear protection structure includes a central portion that covers a central area of the cutter bar body and second wall portions that extend above the first wall portions of the groove sidewalls of the first and second edge grooves, wherein an exposed upper surface of the wear protection surface disposed opposite the flat top surface of the cutter bar body tapers upward relative to the flat top surface of the cutter bar body from the central portion to the second wall portions with the central portion having a first thickness and the second wall portions having second thicknesses greater than the first thickness;
a first carbide strip disposed within the first edge groove and secured to the first edge groove adjacent the first wall portion of the groove sidewall of the first edge groove and a corresponding second wall portion of the wear protection structure, wherein the first carbide strip forms a first cutting edge; and
a second carbide strip disposed within the second edge groove and secured to the second edge groove adjacent the first wall portion of the groove sidewall of the second edge groove and a corresponding second wall portion of the wear protection structure, wherein the second carbide strip forms a second cutting edge.

12. The cutter bar according to claim 11, wherein:
the second wall portions of the wear protection structure are configured such that the top surface of the wear protection structure provides stepped transitions to the first and second carbide strips.

13. The cutter bar according to claim 11, wherein:
the cutter bar body has a substantially rectangular cross-section and the first and second edge grooves are disposed on two opposed edges of the cutter bar body.

14. The cutter bar according to claim 11, wherein:
the first and second edge grooves comprise two parallel edge grooves formed by the cutter bar body.

15. The cutter bar according to claim 11, wherein:
the groove bottom of the first edge groove and a corresponding surface of the first carbide strip that interfaces to the groove bottom have an internal angle $\alpha$ less than or equal to 90°; and
the groove bottom of the second edge groove and a corresponding surface of the second carbide strip that interfaces to the groove bottom have an internal angle $\alpha$ less than or equal to 90°.

16. The cutter bar according to claim 11, wherein:
the first carbide strip comprises a plurality of carbide strips which are arranged in succession in the first edge groove; and
the second carbide strip comprises a plurality of carbide strips which are arranged in succession in the second edge groove.

17. The cutter bar according to claim 11, wherein:
the first and second carbide strips are secured to the first and second edge grooves, respectively, by a bonding agent.
18. The cutter bar according to claim 17, wherein:
the bonding agent comprises solder or adhesive.
19. The cutter bar according to claim 11, wherein:
each one of the first and second carbide strips comprises at least one cemented carbide profile strip.
20. The cutter bar according to claim 11, wherein:
at least a portion of the top surface of the wear protection structure is flat.

* * * * *